United States Patent

Bartley

[11] Patent Number: 5,322,190
[45] Date of Patent: Jun. 21, 1994

[54] DEVICE FOR DISPENSING TISSUE PAPER

[76] Inventor: Seigel M. Bartley, 2835 Harvard Dr., Grand Prairie, Tex. 75052

[21] Appl. No.: 65,475

[22] Filed: May 24, 1993

[51] Int. Cl.⁵ .......................... B65G 59/00; B65H 3/02
[52] U.S. Cl. ...................................... 221/259; 221/210; 221/255; 221/37
[58] Field of Search ............... 221/259, 210, 255, 270, 221/271, 281, 286, 287, 36, 37, 40, 45

[56] References Cited

U.S. PATENT DOCUMENTS

| | | | |
|---|---|---|---|
| 3,094,323 | 6/1963 | Catania | 221/37 X |
| 3,204,817 | 9/1965 | Kostering | 221/36 X |
| 3,248,006 | 4/1966 | Lowery et al. | 221/36 |
| 4,401,233 | 8/1983 | Frey | 221/36 |
| 4,417,670 | 11/1983 | Booher | 221/210 |
| 4,629,092 | 12/1986 | English | 221/259 X |
| 4,905,869 | 3/1990 | Grigsby et al. | 221/286 X |
| 5,054,612 | 10/1991 | Meyer, Jr. | 221/45 X |
| 5,097,984 | 3/1992 | Meisner et al. | 221/37 |
| 5,104,000 | 4/1992 | Goff | 221/259 X |

Primary Examiner—D. Glenn Dayoan
Assistant Examiner—Dean A. Reichard
Attorney, Agent, or Firm—John E. Vandigriff

[57] ABSTRACT

A tissue dispenser for dispensing a single tissue at one time includes a dispenser box having a support back on one end, a movable drawer in said dispenser box for holding tissues, a pivotable arm mounted by a first end to said support back and biased in an upward position by a spring. A tissue pickup member is mounted on a second end of said pivotal arm, having a pickup surface having a tacky adhesive thereon. A cam arm raises and lowers said pivotable arm when a push lever is pressed downward to compress a spring and released to allow the spring to expand, raising said pivotable arm.

7 Claims, 6 Drawing Sheets

DEVICE FOR DISPENSING TISSUE PAPER

FIELD OF THE INVENTION

This invention relates to a dispensing device for tissue paper, and more particularly to a dispenser for dispensing thin paper sheets one at a time from a storage box.

BACKGROUND OF THE INVENTION

Sheet dispensing containers have been made that have slots in the top through which a tissue may be removed by a person's fingers. U.S. Pat. No. 4,946,066 defines a dispenser which has a one-piece unitary main body with the upper piece of the body being a spring-like member that is depressed with a finger. The upper piece has an adhesive thereon to which the tissue adheres. This dispenser does not hold tissues in place if the dispenser is tilted or "knocked-over".

U.S. Pat. No. 2,885,112 discloses an enclosed box dispenser, but the box is of cardboard and is subject to being crushed or not preventing liquids from soaking the box and rendering the tissues unusable.

Various other designs of tissue dispensers are available, including roller dispensers that pick up the tissues, other having spring levers that are depressed to pick up a tissue. For the most part, none of the prior art dispensers are sealable and adapted for easy refill yet protect the tissues during and after use.

SUMMARY OF THE INVENTION

A tissue dispenser for dispensing a single tissue one at a time includes a dispenser box having a support back on one end, a movable drawer in said dispenser box for holding tissues, a pivotable arm mounted by a first end to said support back and biased in an upward position by a spring. A tissue pickup member is mounted on a second end of said pivotal arm, having a pickup surface having a tacky adhesive thereon. A cam arm raises and lowers said pivotable arm when a push lever is pressed downward to compress a spring. The spring is interconnected with said cam arm by a pin and slide plate. When the push lever is pressed downward the spring is compressed and the cam arm is lowered to pickup a tissue. When the push lever is released, the spring decompresses and the cam arm is raised, moving the pivotable arm and pick-up member upward, picking up a tissue.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1:
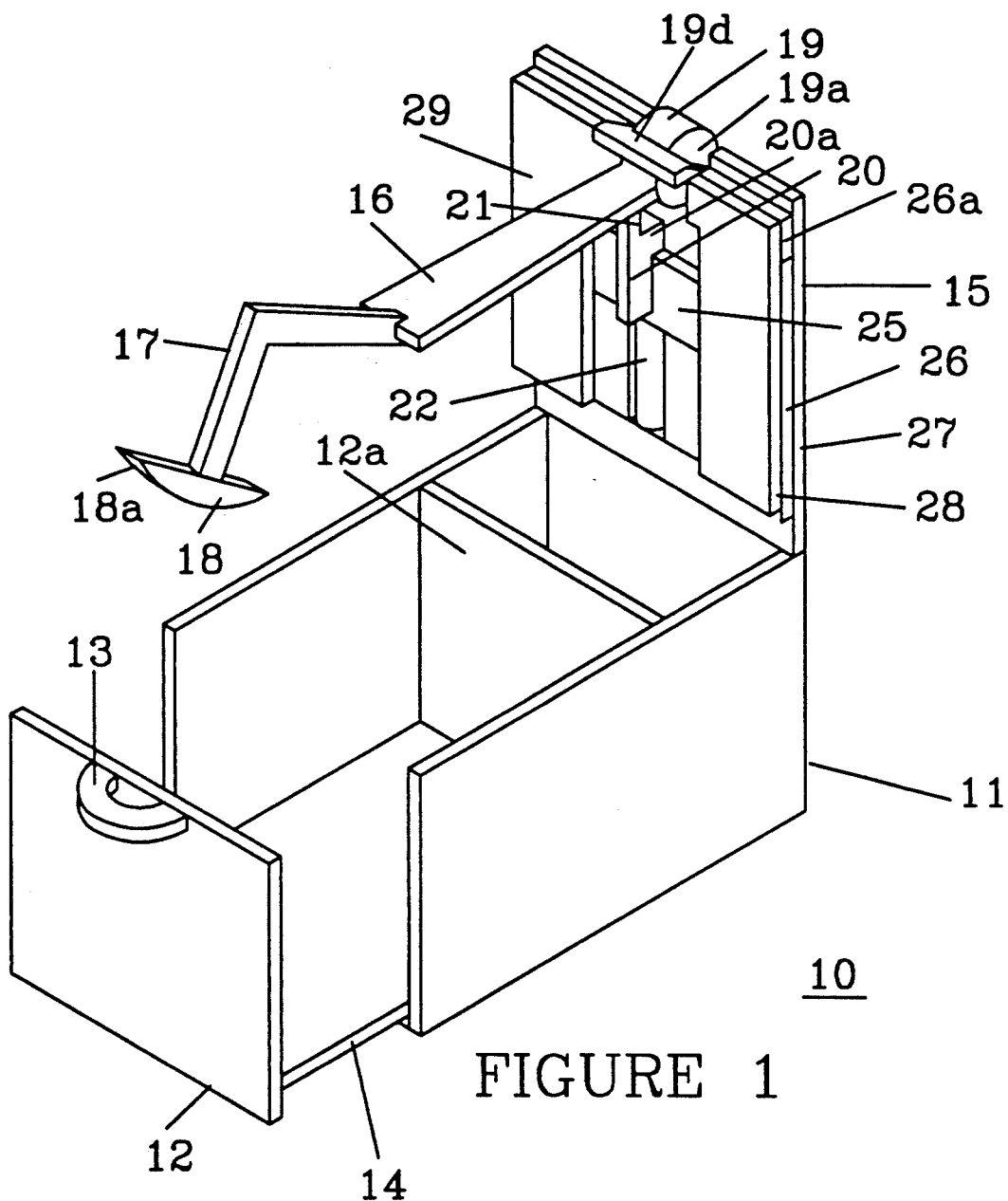
FIG. 1 shows the dispenser of the present invention from a first direction.

FIG. 1 is an isometric view of the tissue dispenser 10 of the present invention. Dispenser 10 has a box 11 which includes slide drawer 12. Drawer 12 has a bottom 14 which slides in and out of dispenser box 11. Handle 13 is grasped to move drawer 12 in and out of box 11. Draw 12 has a back wall 12a which is attached on the opposite end of bottom 14 from draw 12. Attached to, or alternately an integral part of box 11, is back support 27. Attached to back support 27 are plates 28 and 29. Plates 28 and 29 are spaced from back support 27 by spacer 26a, and another spacer not shown in FIG. 1, leaving opening 26 between back support 27 and plates 28 and 29. Slide plate 25 is positioned in the opening 26 between back support 27 and plates 28 and 29, and is free to move vertically up and down. Slide plate 25 is attached to and supported by pin 22. Attached to and positioned at the front and upper edge of plate 25 is cam arm 20. Cam arm 20 has an arm 20a that extends over the top edge of slide plate 25. Cam arm 20 is securely attached to slide plate 25 and moves vertically, up and down, as slide plate 25 moves.

On one end of cam arm 20 is cam end 21 that provides a cam surface as described below.

In the upper end of back support 27 is an opening 19a in which is mounted pivot arm 16 attached to and integrally formed with rotational end 19. Rotational end 19 is secured to back support 27 by a pin (not illustrated) allowing pivot arm 16 to freely rotate. Stop 19d ensures that pivot arm 16 stops at its initial position. Attached to the end of pivot arm 16, opposite rotational end 19, is arm 17. Arm 17 is generally L-shaped, but the two parts of arm 17 are not necessarily at a ninety degree angle to each other. Arm 17 may be securely attached to pivot arm 16, or attached so that the connection may be loosened temporarily so that it may be rotated and then secured. Attached to arm 17 is pick-up member 18. Member 18 has a pick-up surface that may have a tacky-adhesive or tape thereon, as described below.

Figure 2:
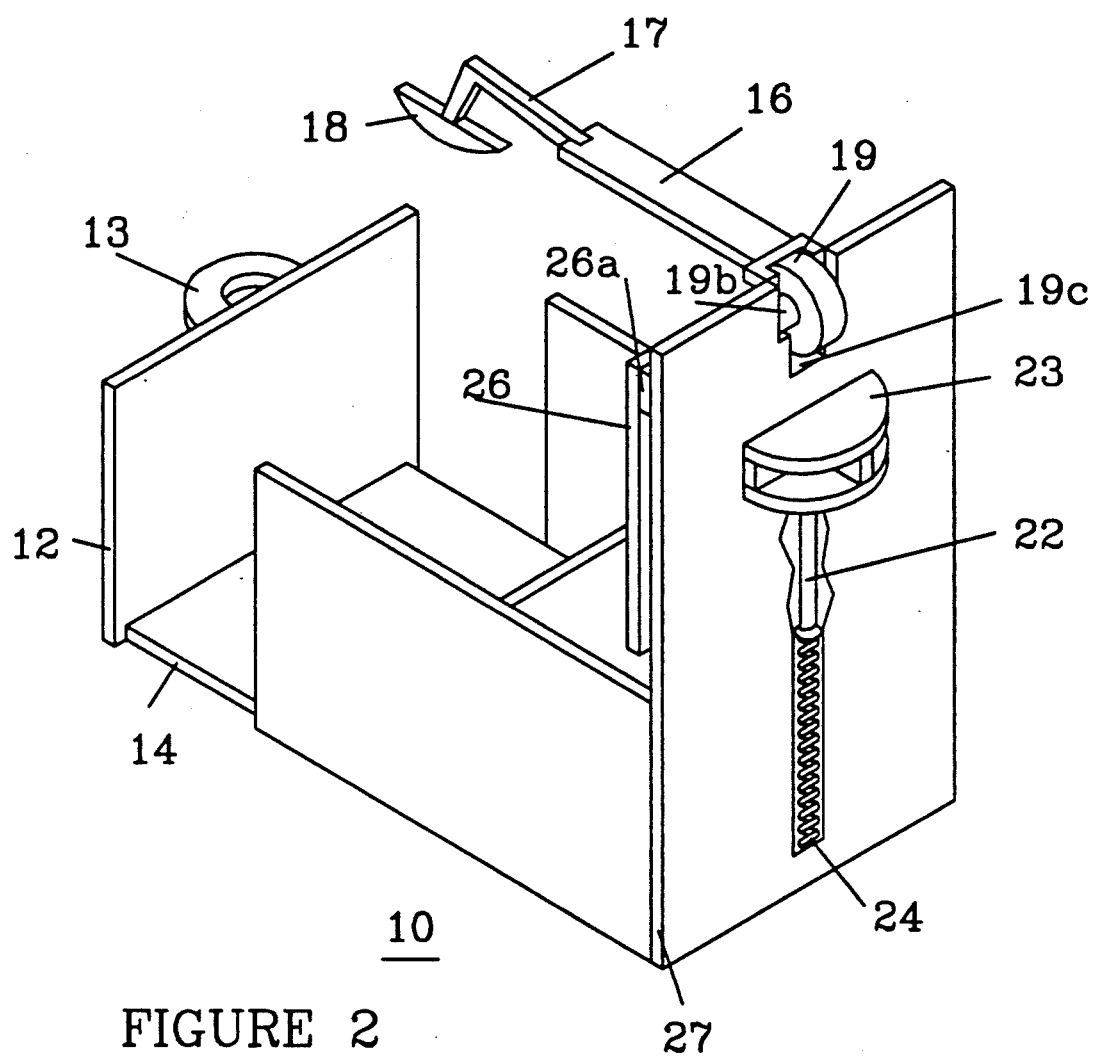
FIG. 2 illustrates the dispenser of the present invention from a second direction.
Figure 3:
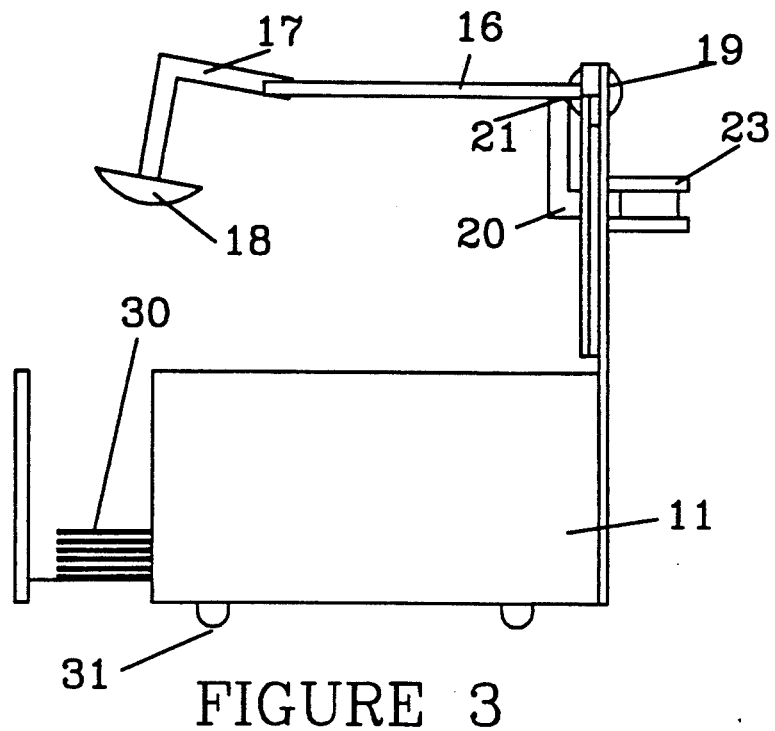
FIG. 3 is side view of the dispenser with the tissue picker in a raised position.
Figure 4:
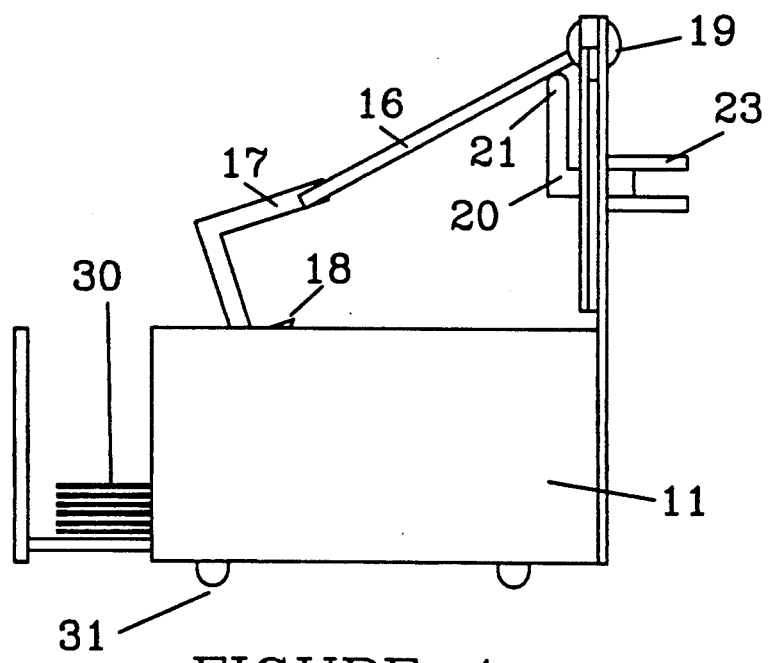
FIG. 4 is side view of the dispenser with the tissue picker in a partially downward position.
Figure 5:
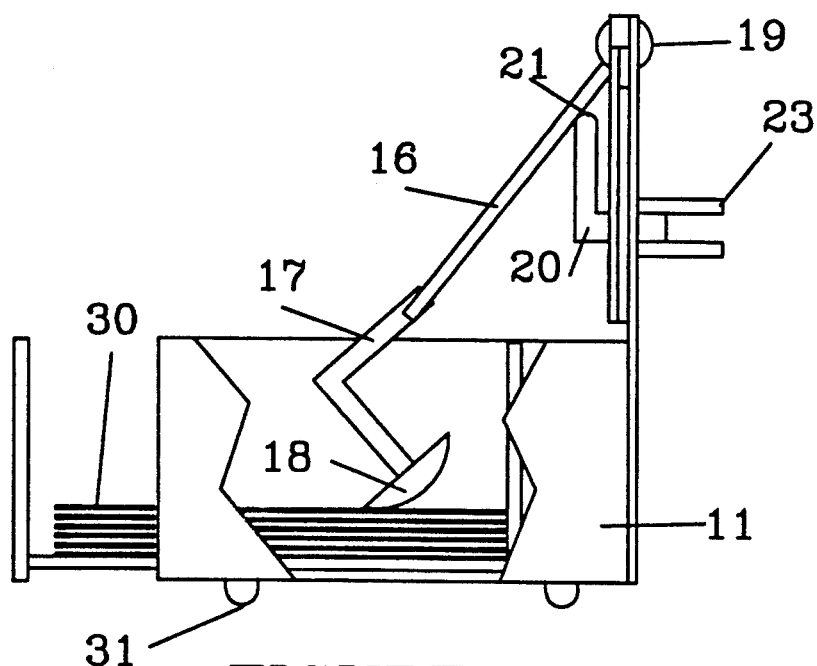
FIG. 5 is side view of the dispenser with the tissue picker in a lowered position contacting a tissue to be picked-up.

FIG. 2 is an isometric view of the tissue dispenser, showing the back side of support plate 27. Pin 22 is shown with push lever 23 attached to the top of pin 22. Push lever 23 is also attached to slide plate 25 (FIG. 1). Pin 22 rides on the top of spring 24. A portion of support plate 27 has been removed to show spring 24. When, push lever 23 is pushed downward, pin 22 compresses spring 24. When push lever 23 is released, spring 24 moves push lever 23, pin 22 and slide plate 25 upward.

The operation of the tissue dispenser box is as follows. Referring to FIGS. 1 and 2, push lever 23 is pushed downward moving pin 22, compressing spring 24. As push lever 23 is moved downward slide plate 25 and cam arm 20 are moved downward since slide plate is attached to push lever 23, and cam arm 20 is attached to slide plate 25. As cam arm 20 is moved downward, pivot arm 16 follows cam end 21, lowering pivot arm 16, arm 17 and member 18. Member 18 is lowered into dispenser box 11 engaging tissues (not illustrated). When push lever 23 is released, compressed spring 24 moves pin 22, push lever 23, slide plate 25 and cam arm 20 upward. As cam end 21 moves upward, pivot arm 17, and member 18 moves upward, lifting a single tissue out of dispenser box 11. A tissue adheres to adhesive surface 18a, but is easily removed since the adhesive is only a tacky adhesive and does not rigidly secure the tissue to member 18.

When in use, or to refill the dispenser, drawer 12 is pulled out of dispenser box 11. When not in use, drawer 12 is pushed into box 11, and a cover, not illustrated, may be placed over box 11 to prevent dirt and moisture from entering the dispenser.

Figure 6:
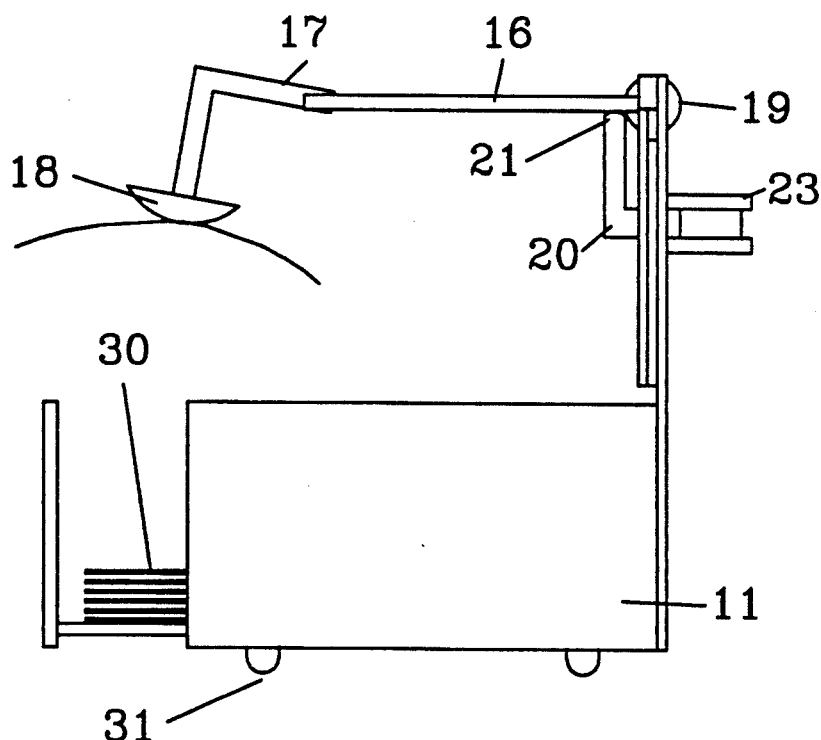
FIG. 6 is a side view of the dispenser with the tissue picker in the raised position.

FIGS. 3, 4, 5 and 6 illustrate the procedure for picking up and dispensing a tissue from box 11. Push lever 23 is pushed downward to lower cam arm 20, and to compress spring 24. Pivot arm 16, arm 17 and member 18 is lowered (FIG. 4), until member 18 is in contact with a tissue 30 FIG. 5). Push lever 23 is then released. Spring 24 expands pushing pin 22, slide plate 25 and cam arm upward raising pivot arm 16 lifting member and an attached tissue 30 out of box 11 (FIG. 6). The single tissue then may be easily removed from member 18. Rubber feet 31 ensures that the dispenser box is stationary when push lever 23 is pushed downward.

Figure 7:
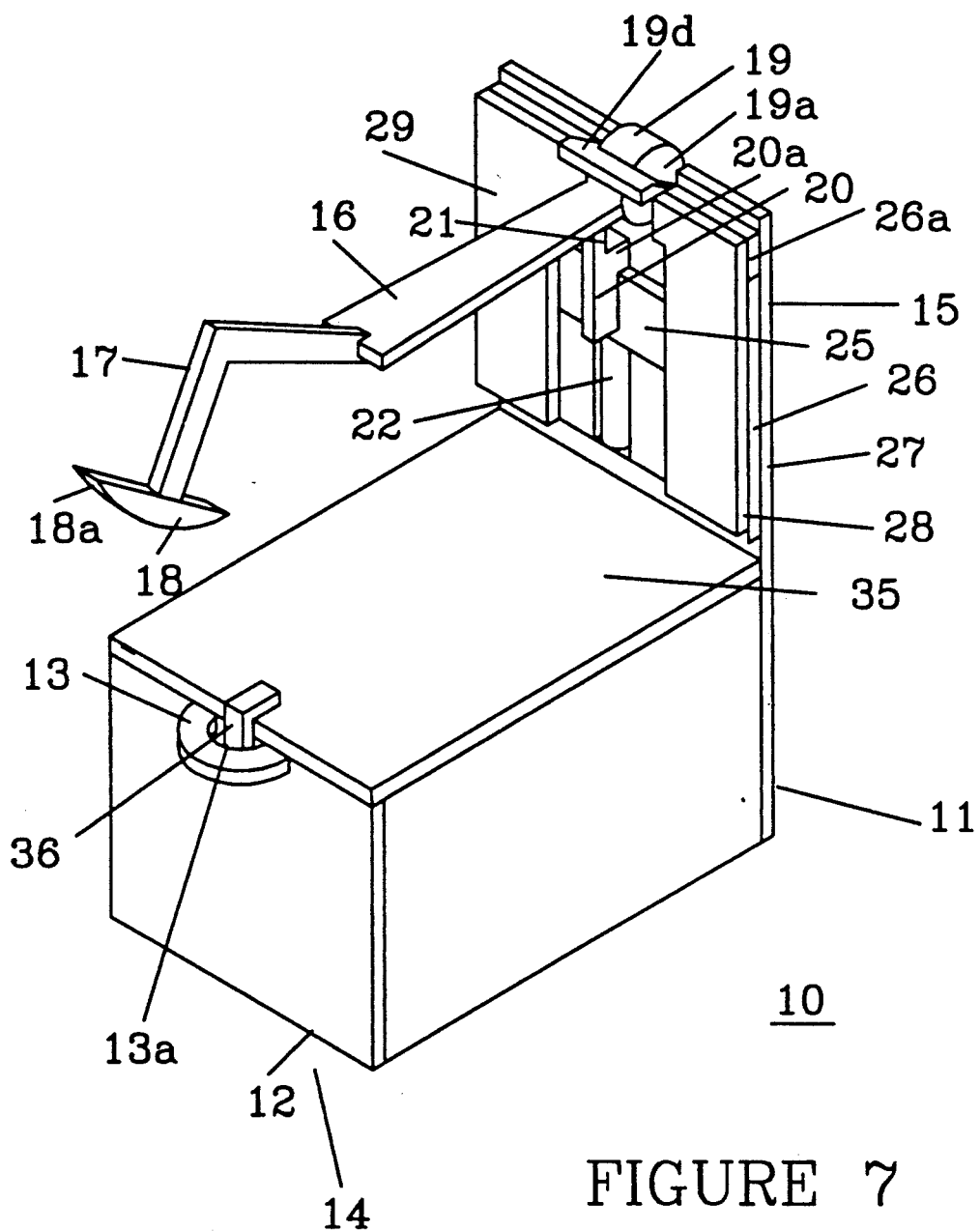
FIG. 7 illustrates the dispenser with a lid over the tissues.
Figure 7A:
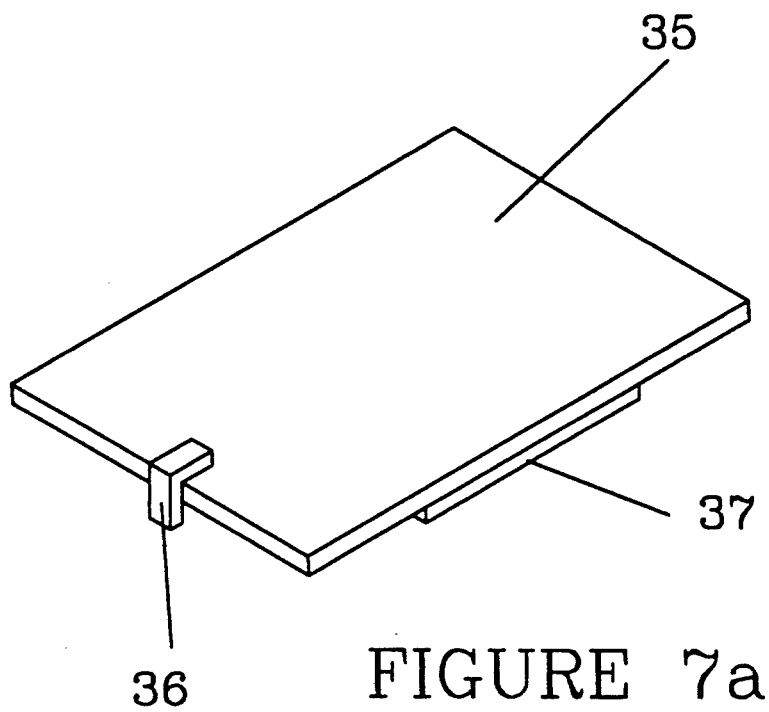
FIG. 7a is the dispenser lid.

FIG. 7 shows dispenser 10 with a cover 35 over the tissues, to protect them from dust and moisture when the dispenser is not in use. FIG. 7b shows only the cover 35. On one end of cover 35 is a pin 36 that resides in opening 13a of handle 13. Pin 36 holds cover 35 in place along with side rails 37, that prevents cover 35 from moving sideways over the dispenser. Only one side rail 37 is illustrated in FIG. 7a, another side rail is on the opposite side of cover 35 from side rail 37.

Figure 8:
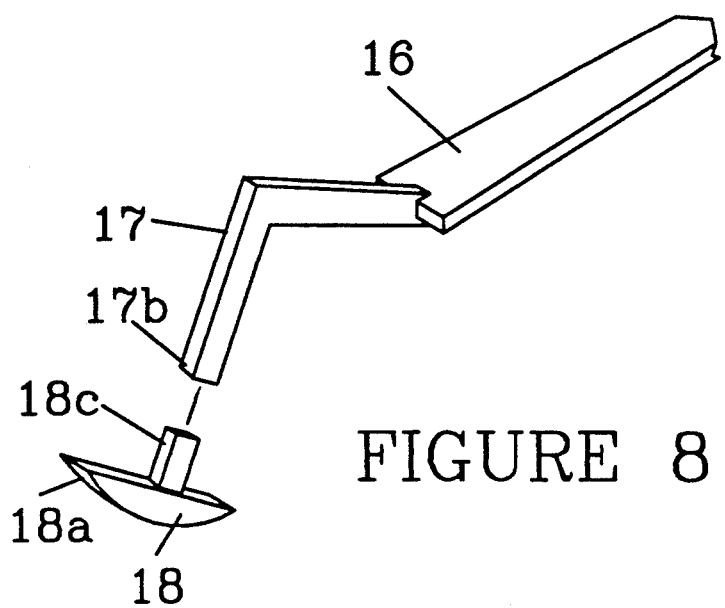
FIG. 8 illustrates the removed tissue pick-up member.

FIG. 8 shows that tissue pick-up member 18 is detachable from arm 17. In one embodiment, arm 17 end 17b is hollow and member pin 18c is pushed up into end 17b and held there by friction. Member pin 18c is illustrated as rectangular, but may be round. Member pin 18c is slightly tapered so that it is held in arm end 17b by friction, but may be easily removed.

What is claimed is:

1. A tissue dispenser for dispensing a single tissue at one time, comprising:
   a dispenser box having a support back on one end;
   a movable drawer in said dispenser box for holding tissues;
   a pivotable arm mounted by a first end to said support back;
   a tissue pickup member, mounted on a second end of said pivotal arm, having a pickup surface having a tacky adhesive thereon;
   a cam arm for raising and lowering said pivotable arm and
   a cover for enclosing said dispenser box, said cover having at least one side rail for positioning the cover over the dispenser box and a pin on one end for securing said cover to said drawer.

2. The tissue dispenser according to claim 1, including a lever attached to said cam arm, for lowering said cam arm to lower said pivotable arm and tissue pickup member to pick up a tissue.

3. The tissue dispenser according to claim 1, including a push pin and compression spring, said push pin compressing said spring when a tissue is being picked up and said compressed spring decompressing to lift a tissue out of said dispenser box.

4. The tissue dispenser according to claim 1, wherein the tissue pickup member is removable for replacement.

5. The tissue dispenser according to claim 1, wherein said cam arm is in sliding contact with said pivotable arm.

6. The tissue dispenser according to claim 1, including a slide plate, push lever and a spring, said cam arm attached to said slide plate, and said spring being compressed when said push lever is pressed downward to pick up a tissue, and said compressed spring moving said slide plate and cam arm upward when the push lever is released.

7. A tissue dispenser for dispensing a single tissue at one time, comprising:
   a dispenser box having a support back, and a pair of spaced apart plates, on one end;
   a movable drawer in said dispenser box for holding tissues;
   a spring;
   a slide plate, movable between said pair of spaced apart plates, and having a cam arm attached to one end;
   a pivotable arm mounted by a first end to said support back and biased in an upward position by said cam arm and said spring;
   a tissue pickup member, mounted on a second end of said pivotal arm, having a pickup surface having a tacky adhesive thereon;
   said cam arm raising and lowering said pivotable arm;
   said spring interconnected with said cam arm, said spring being compressed when said cam arm is lowered to pickup a tissue and decompressed to raise said cam arm and tissue pickup member.

* * * * *